June 6, 1961  R. BLECKMANN  2,987,283
MOUNTING FOR ELECTRIC HEATERS
Filed July 24, 1959  2 Sheets-Sheet 1
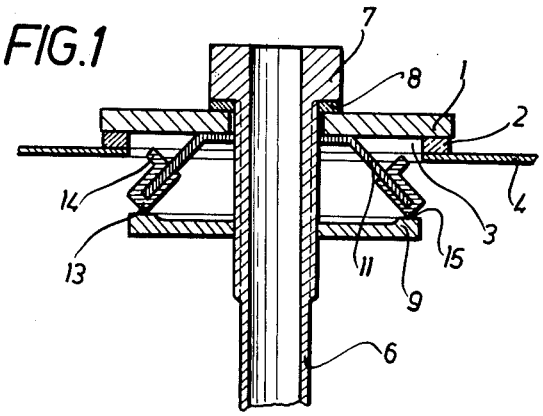
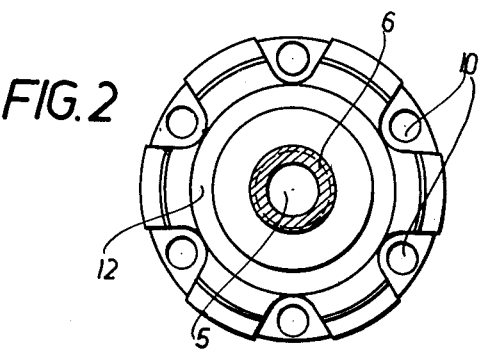
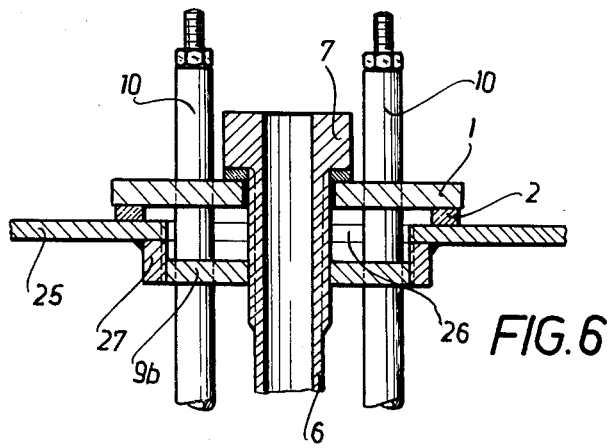

June 6, 1961 R. BLECKMANN 2,987,283
MOUNTING FOR ELECTRIC HEATERS
Filed July 24, 1959 2 Sheets-Sheet 2
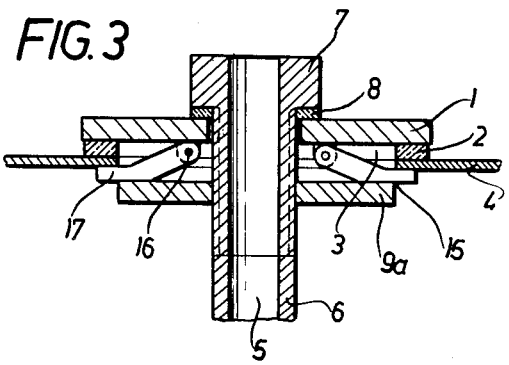
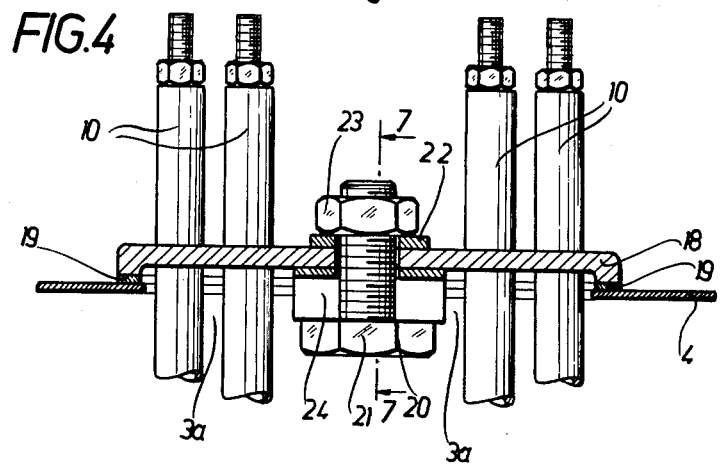
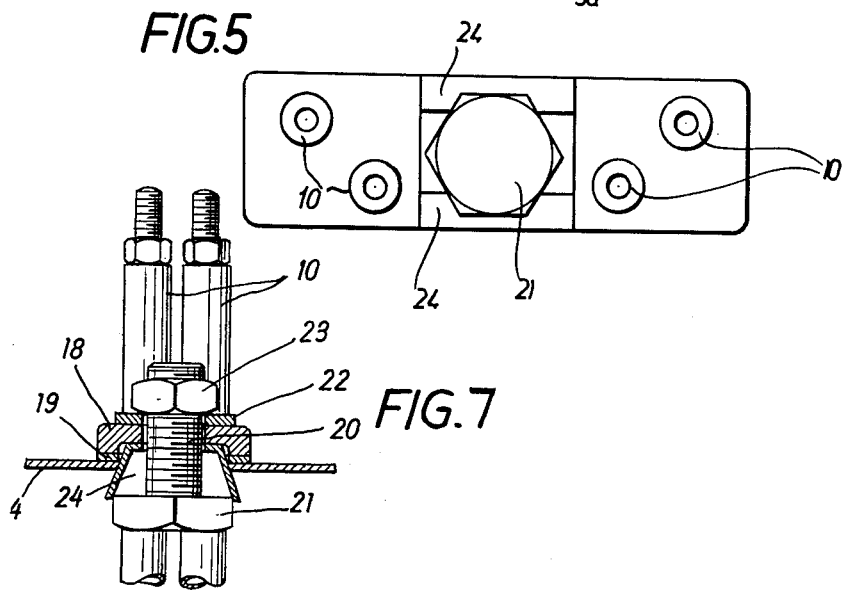

United States Patent Office 2,987,283
Patented June 6, 1961

2,987,283
MOUNTING FOR ELECTRIC HEATERS
Richard Bleckmann, Imberstrasse 24, Salzburg, Austria
Filed July 24, 1959, Ser. No. 829,376
Claims priority, application Austria July 31, 1958
9 Claims. (Cl. 248—56)

This invention relates to a flange for fixing electric heaters, particularly tubular heaters, to openings of containers, housing walls, or the like, of electrically heated equipment. It is an object of the invention to provide a flange of the type described which enables the fixing of the heater in the equipment in a predetermined position and which can easily be assembled even where the opening in the equipment is easily accessible only from one side and in which no backstays fixed to the equipment wall or other reinforcing parts are required. In the flange according to the invention, backstays are used which can be inserted through the openings of the container or housing wall or the like and which when thus inserted can be extended over the rim of the opening on the inside by a pivotal movement about an axis which is substantially parallel to the flange plate whereafter the flange can be tightened against the backstays by means of screws.

The invention resides essentially in that the backstays are disposed between the heaters, which extend liquid-tightly through the flange plate, and bear on the flange with ends which in the inserting position point towards a counterflange plate, which is connected to the flange by at least one tightening screw and which can be inserted through the opening so that the backstays extend beyond the flange-side rim of the counterflange plate when the counterflange plate is adjusted by tightening the tightening screws.

In the construction according to the invention all requirements to be met by a flange which serves for the fixation of heaters are fulfilled. The flange and backstay form a unit of construction which can be removed and mounted together with the heaters. The flange can easily be affixed to housing walls which are accessible only from one side and does not require a special pre-treatment or reinforcement of the rim portion of the opening.

In a preferred embodiment the counterflange plate has guide faces etc. for the backstays, which guide faces guide the backstays into their extended position during the adjustment of the counterflange plate. The backstays can be swung or bent outwardly about axes spaced from the flange. It is much more convenient, however, if the backstays can be extended outwardly about pivotal or bending axes close to the flange plate surface which faces the opening so that the backstays extending over the rim of the opening when the screw has been tightened are approximately parallel to the counterflange plate and in snug engagement therewith. In this construction the backstays are practically stressed only in shears because the counterflange plate is only somewhat smaller than the opening and the backstays are clamped between the counterflange plate and the rim of the opening. For this reason relatively weak backstays may be used. To remove a flange it is sufficient to loosen the counterflange to such an extent that the backstays can be reversely deflected or pivoted to their initial position by pulling on the flange so that the entire flange can be pulled out together with the heater.

In a preferred embodiment the tightening screw extending through the opening in the container consists of a tube which serves, e.g., as a protective tube for a temperature detector of a thermostat or of an overheat preventing device. In connection with such flanges it is often necessary to provide a temperature detector for the heater. In the described embodiment the flange is simply provided instead of a usual screw with a tube through which the temperature detector is inserted whereas a change in the arrangement of the backstays of heaters is not required.

The backstays may consist of sheet metal claws which are affixed to the flange and can be deflected outwardly with the aid of the counterflange, or they may consist of leverlike claws which are pivoted to the flange at one end. It is also possible to use a rubber cup as a backstay, the bottom of which is fixed to the flange and which has openings through which the heaters extend whereas the rim of the cup spreads outwardly when the counterflange is being tightened. The rim of the rubber cup may be reinforced by spaced sheet metal plates affixed thereto.

In another development of the invention the counterflange plate is circular and has a screw-in screw thread on its outside periphery. This construction enables the use of the flange according to the invention in the manner hereinbefore, with plain, unprepared housing openings, the inside wall of which is overlain by the extended backstays, as well as in cases in which the housing wall has already been provided with means for receiving so-called screw-in threads of the previously usual type. If the flange is to be used of a screw-in head the counterflange plate is first screwed into the screw-in thread provided adjacent to the opening. The tubular heaters affixed to the flange extend in most cases through the opening in the counterflange plate to transmit a rotation of the flange to the counterflange plate. In this way the described screwing of the flange can be most easily performed. After the counterflange plate has been screwed in, the flange is clamped with the aid of the screw or screws extending through the opening against the counterflange plate, which finds an adequate abutment in the screw thread. It is readily possible to move the flange exactly to the desired angular position because the final tightening will only be effected with the aid of the screw or screws connecting the flange to the counterflange plate. In the last-mentioned construction the backstays and the counterflange plate are preferably arranged to be readily replaceable so that the backstays can be removed where the flange is used instead of a screw-in head.

Further details and suitable embodiments of the invention are apparent from the subsequent description of the accompanying drawings.

In the accompanying drawings the subject matter of the invention is illustrated by way of example.

FIGS. 1 and 2 show a circular flange in mounted position in a sectional view and a view from the inside with the counterflange removed, respectively. In FIG. 1 the heaters affixed to the flange have been omitted for greater clarity.

FIG. 3 is a sectional view showing another embodiment of the circular flange, also in mounted position.

FIGS. 4 and 5 show an oblong flange in a sectional view and a view from the inside, respectively, and FIG. 6 is a sectional view showing a circular flange mounted in a housing opening inherently intended to receive a screw-in head.

FIG. 7 is a sectional on the line 7—7 of FIG. 4.

According to FIGS. 1 to 3 a circular flange 1 is provided which is applied with an intervening gasket 2 to the container wall 4 having an opening 3. The flange has a central passage opening 5 through which a screw consisting of a tube 6 and having a head 7 is inserted. A further gasket 8 is interposed between the head 7 and the flange 1. The tube 6 has screwed thereon a counterflange plate 9, which has a central screw-threaded opening and is somewhat smaller in diameter than the opening 3 so that it can be inserted through the same. The counterflange plate 9 can be adjusted towards the flange by a rotation of the screw 6, 7. The tube 6 may accommodate, e.g. a temperature detector of a thermostat or overheat preventing device for the tubular heaters 10 extending through the flange 1 and the counterflange 9. It is also possible, of course, to provide the temperature detector in contact with the heaters themselves and to dispose in the tubes only transmitting elements operated by the temperature detector. The shell of the tubular heater affixed to the flange may be liquidtightly soldered or welded to the latter in openings of the flange.

According to FIGS. 1 and 2, sheet metal claws 11 are provided, which are blanked as a unit from a common piece of sheet metal 12 and which form together a star-shaped sheet metal element. The claws 11 extend between the heaters. As is apparent from FIG. 1 each of the claws 11 may carry a reversely bent reinforcing sheet metal element 13, which has an upturned edge portion 14 directed toward the flange. According to FIG. 1 the several claws are angled from the central portion 12 which engages the flange 1 so that the ends of the claw engage the rim portion of the counterflange 9 provided with guide noses 15. When the counterflange 9 is adjusted towards the flange by a rotation of the screws 6, 7 the claws are deflected back towards the flange and at the same time extend outwardly over the inside rim of the opening 3, the upturned edge portion 14 of the reinforcing element 13 bearing on the flange 1. Tightening the screw 7, 6 and consequently the counterflange 9 causes the claws to be clamped between the counterflange 9 on the one hand, and the wall 4 and the flange 1, on the other hand, so that the flange 1 is forced against thew all at the same time.

According to FIG. 3 the claws 11 and 14 are replaced by leverlike claws 17 pivoted to the flange 1 on pivots 16. These claws 17 can also be adjusted with the aid of the counterflange 9a which need not be provided with guide noses in this construction. Instead of the sheet metal elements 11, 12 shown in FIGS. 1 and 2, a rubber body may be provided which is similar in shape to the above-mentioned parts but has a somewhat larger wall thickness.

According to FIGS. 4, 5 and 7 the opening 3a of the container wall 4 consists of an oblong hole. In accordance therewith the flange 18 provided is also of oblong shape. A gasket 19 is again inserted between the flange and the container wall. The flange has a central opening through which a screw 20 extends the head 21 of which is disposed on the inside of the flange and can be adjusted towards the flange by means of a nut 23, which is mounted on the screw 20 on the outside. A gasket 22 is interposed. The heaters 11 extend through the flange adjacent to the ends of the latter. Sheet metal claws 24 are again provided between the inside surface of the flange and the nut 21. An adjustment of the nut 23 and consequently of the head 21 of the screw causes these claws 24 to extend over the longitudinal edges of the opening and to form backstays when the flange is being tightened. To remove the flange the nut 23 is loosened whereafter the claws can be deflected back to the position shown in the drawing by pulling on the flange so that the flange can then be removed.

The flange shown in FIG. 6 corresponds in its basic construction to the flange according to FIGS. 1 and 2 or FIG. 3. For this reason, like reference characters have been used for equal parts. The backstays 11 or 17 have been removed and the counterflange plate 9b is provided with an external screw thread. The tubular heaters 10 which extend liquidtightly through the flange 1 extend freely through openings in the counterflange plate 9b. Just as in the other constructions the counterflange plate 9b can be adjusted towards the flange by turning the screw 7. The container wall 25 has a large wall thickness and is provided adjacent to the opening 26 with a welded nut 27, which serves normally for receiving a screw-in head. The external screw thread of the counterflange plate 9b is in threaded engagement with this nut. The screwing is effected in a simple manner by a rotation of the entire flange, the heaters 10 causing the counterflange plate 9b to rotate in unison therewith. After the flange 1 has been screwed in to the desired angular position it is clamped against the counterflange plate 9b by tightening the screws 6, 7 so that the flange is forced against the housing wall 25. The flange 1 could be provided with handles or being, e.g., of polygonal configuration to facilitate the screwing of the flange with the aid of a suitable tool.

It is obvious that the described embodiments have been disclosed only by way of example and may be modified in construction without departing from the scope of the invention.

What is claimed is:

1. A flange assembly for fixing electric heater means to a wall having an opening through which said heater means extend, said assembly comprising a flange plate, angularly spaced backstays connected to one side of said flange plate and having free end portions spaced from said flange plate in a direction transverse to said flange plate, said flange plate being formed with at least two openings adapted to receive said heater means and disposed between adjacent backstays, said backstays being adapted to assume a non-retaining position in which the normal projection of said free ends on said flange plate is spaced by a substantial amount inwardly from the outside periphery of said flange plate, said backstays being spreadable under the action of pressure exerted on said free end portions towards said flange plate from said non-retaining position to a retaining position, whereby said free end portions are moved towards said outside periphery of said flange plate, a counterflange plate engaging said free end portions of said backstays, said counterflange plate being formed with openings axially aligned with said openings in said flange plate and adapted to receive said heater means, a screw connected to said counterflange plate and extending through said flange plate to be accessible from the other side of said flange plate, and being operable to move said counterflange plate towards said flange plate and cause said counterflange plate to exert pressure on said free end portions in a direction toward said flange plate, whereby said backstays are moved to said retaining position, said openings in said flange plate and counterflange plate being eccentrically disposed with respect to said screw, and locking means for releasably locking said screw in the position thus obtained.

2. A flange assembly as set forth in claim 1, in which said counterflange plate is provided on the side facing said flange with guide means which are in engagement with said backstays and adapted to guide them from said non-retaining position to said retaining position when said counterflange plate is moved toward said flange plate.

3. A flange assembly as set forth in claim 1, in which said backstays comprise a plurality of backstay arms which are deflectable about axes which are disposed close to the surface of said flange plate facing said counterflange plate from said non-retaining position to a retaining position in which they extend substantially parallel to said counterflange plate and in snug engagement therewith by a movement of said counterflange plate toward said flange plate.

4. A flange assembly as set forth in claim 3, in which said backstays comprise a plurality of sheet metal claws.

5. A flange assembly as set forth in claim 4, in which said claws have free end portions carrying sheet metal elements fitted thereon and connected thereto.

6. A flange assembly as set forth in claim 4, in which said sheet metal claws are integrally united in a common blank.

7. A flange assembly as set forth in claim 6, in which said flange plate is circular and said blank is star-shaped.

8. A flange assembly as set forth in claim 1, in which said screw comprises a tubular screw member having an axial through opening and adapted to serve as a protective tube for a temperature detector.

9. The combination of a wall having an opening for receiving electric heater means with a flange assembly for fixing said heater to said wall, said flange assembly comprising a flange plate disposed on one side of said wall and overlapping said wall throughout the periphery of said opening, angularly spaced backstays connected to the side of said flange plate facing said wall and having free end portions spaced from said flange plate in a direction transverse to said flange plate, said flange plate being formed with at least two openings adapted to receive said heater means and disposed between adjacent backstays, said backstays being adapted to assume a non-retaining position in which the normal projection of said free end portions on said flange plate is inwardly spaced from the periphery of said opening, said backstays being spreadable under the action of pressure exerted on said free end portions in a direction toward said flange plate from said non-retaining position to a retaining position in which said end portions engage opposite sides of said wall, a counterflange plate engaging said free end portions of said backstays, said counterflange plate being formed with openings axially aligned with said openings in said flange plate and adapted to receive said heater means, a screw connected to said counterflange plate and extending through said flange plate to be accessible from the other side of said flange plate, and being operable to move said counterflange plate towards said flange plate and cause said counterflange plate to exert pressure on said free end portions in a direction toward said flange plate, whereby said backstays are moved to said retaining position, said openings in said flange plate and counterflange plate being eccentrically disposed with respect to said screw, and locking means for releasably locking said screw in the position thus obtained, whereby said wall is clamped between said flange plate and said backstay means.

References Cited in the file of this patent

UNITED STATES PATENTS

| 757,641 | Saunders | Apr. 19, 1904 |
| 2,398,041 | Russell | Apr. 9, 1946 |

FOREIGN PATENTS

| 900,158 | Germany | Dec. 21, 1953 |